(12) United States Patent
Hansen

(10) Patent No.: US 9,157,159 B2
(45) Date of Patent: Oct. 13, 2015

(54) SYSTEM AND METHOD FOR GENERATING HYDROGEN AND OXYGEN GASES

(71) Applicant: Don Lee Hansen, Renton, WA (US)

(72) Inventor: Don Lee Hansen, Renton, WA (US)

(*) Notice: Subject to any disclaimer, the term of this patent is extended or adjusted under 35 U.S.C. 154(b) by 0 days.

(21) Appl. No.: 14/542,702

(22) Filed: Nov. 17, 2014

(65) Prior Publication Data

US 2015/0068889 A1    Mar. 12, 2015

(51) Int. Cl.
  *C25B 9/02*    (2006.01)
  *C25B 9/06*    (2006.01)
  *C25B 9/08*    (2006.01)
  *C25B 1/06*    (2006.01)

(52) U.S. Cl.
  CPC ... *C25B 9/08* (2013.01); *C25B 1/06* (2013.01); *C25B 9/02* (2013.01); *C25B 9/063* (2013.01); *Y02E 60/366* (2013.01)

(58) Field of Classification Search
  None
  See application file for complete search history.

(56) References Cited

U.S. PATENT DOCUMENTS

| | | | | |
|---|---|---|---|---|
| 3,310,483 A * | 3/1967 | Rhodes | | 204/268 |
| 4,014,777 A * | 3/1977 | Brown | | 204/228.5 |
| 4,369,737 A * | 1/1983 | Sanders et al. | | 123/3 |
| 4,450,060 A * | 5/1984 | Gonzalez | | 204/268 |
| 5,542,624 A * | 8/1996 | Smith | | 244/1 A |
| 8,075,750 B2 * | 12/2011 | McAlister | | 204/260 |
| 8,168,047 B1 * | 5/2012 | Smith | | 204/255 |
| 8,808,528 B2 * | 8/2014 | Richardson | | 205/628 |
| 8,852,410 B1 * | 10/2014 | Turgeon et al. | | 204/267 |
| 2006/0183011 A1 * | 8/2006 | Mittelsteadt et al. | | 429/30 |
| 2007/0151846 A1 * | 7/2007 | Klein | | 204/237 |
| 2010/0065419 A1 * | 3/2010 | Richardson | | 204/228.2 |
| 2010/0258449 A1 * | 10/2010 | Fielder | | 205/628 |
| 2010/0282600 A1 * | 11/2010 | Dees et al. | | 204/242 |
| 2012/0175268 A1 * | 7/2012 | Joshi et al. | | 205/412 |
| 2012/0234265 A1 * | 9/2012 | Ball | | 123/3 |
| 2012/0305407 A1 * | 12/2012 | Anderson et al. | | 205/619 |
| 2014/0090986 A1 * | 4/2014 | Bethurem | | 205/462 |

OTHER PUBLICATIONS

"Frame", http://www.google.com/search?q=frame+definition, accessed Jan. 29, 2015.*
"Lightning", http://en.wikipedia.org/wiki/Lightning, accessed on Feb. 9, 2015.*

* cited by examiner

*Primary Examiner* — Harry D Wilkins, III
(74) *Attorney, Agent, or Firm* — Berry Choobin; Patent 360

(57) ABSTRACT

The embodiments herein provide a HHO generating system and method for generating hydrogen, oxygen and methane. The system adopts electrolysis process to generate a HHO gas from a water-electrolyte solution. The system comprises a reaction tank filled with the water-electrolyte solution, a plurality of disks stacked one above another, a plurality of frames connecting to the disks and an external power supply. The disks comprise a plurality of negatively charged cathode disks and a plurality of positively charged anode disks. The plurality of frames comprises a plurality of conductive frames and a plurality of support frames configured to hold the disks. An electric current is supplied to the conducting frames so as to electrically charge the disks that react with the water-electrolyte solution to produce the HHO gas. The disks are copper-nickel alloy disks in a ratio of 70:30.

26 Claims, 16 Drawing Sheets

SYSTEM AND METHOD FOR GENERATING HYDROGEN AND OXYGEN GASES

CROSS-REFERENCE TO RELATED APPLICATION

The present application claims the benefit and priority of the U.S. Provisional patent application with Ser. No. 61/905,224 filed on Nov. 17, 2013 and the entire contents of which is incorporated by reference herein.

BACKGROUND

1. Technical Field

The embodiments herein generally relate to a method and system for generating gaseous reactants. The embodiments herein particularly relates to a method and system for producing hydrogen and oxygen. The embodiments herein more particularly relates to a method and system for producing hydrogen and oxygen using electricity.

2. Description of the Related Art

The most common power source for non-air breathing engines or motors such as those in unmanned undersea vehicles (UUVs), satellites, lunar bases, and unmanned aerial vehicles (UAVs), are conventional batteries. However, conventional batteries have a low energy density and, thus, lack sufficient energy capacity for many desirable applications. The few types that may provide sufficient energy capacity, such as lithium thionyl chloride, are cost prohibitive.

"Brown's Gas" is oxyhydrogen with a 2:1 molar ratio of $H_2$ and O2 gases, the same proportion as in water. The Brown's Gas is also called as "HHO gas". It has been discovered that the HHO gas can be used as a fuel for the internal combustion engine. The HHO produced from a HHO hydrogen generator is injected into a combustion engine to dramatically improve the performance of the combustion engine and result in the engine running cleaner. Electrolysis of water is commonly performed to produce the HHO gas. The electrolysis process involves applying an electrical current to distilled water, thereby splitting H2O combination of the water into H2 and O. Since the chemical bonds between the hydrogen atoms and oxygen atoms in the water are so strong, some forms of catalyst are added to the water so as to loosen the bonds. The catalyst is mainly used in the electrolysis process so that less electricity is needed in the process to generate the HHO gas.

In the view of foregoing, there is a need to provide a system and method which makes efficient use of electricity to electrolyze water into HHO, a mixture of pure hydrogen and oxygen. The generated mix is used as fuel that is much more powerful than gasoline. Further there is a need for using suitable materials in manufacturing the HHO generation system so as to increase a productivity of HHO gas. Furthermore there is a need for placing the electrodes (cathode and anode) in an improved sequential manner in the HHO generation system so as to produce greater amount of HHO gas.

The above mentioned shortcomings, disadvantages and problems are addressed herein and which will be understood by reading and studying the following specification.

OBJECTS OF THE EMBODIMENTS HEREIN

The primary object of the embodiments herein is to provide a method and system for generating reactant gases from a liquid by using electricity.

Another object of the embodiments herein is to provide for an efficient method for generating hydrogen and oxygen from a liquid dissolved with a catalyst.

Yet another object of the embodiments herein is to provide a HHO generating system consuming less electricity to produce the reactant gases.

Yet another object of the embodiments herein is to develop a HHO generating system provided with a plurality of disks acting as electrodes in the electrolysis process.

Yet another object of the embodiment herein is to develop a HHO generating system in which the positive and negative charges are applied to the plurality of disks in a sequential manner.

Yet another object of the embodiments herein is to develop a HHO generating system with increased efficiency of HHO generation process by adding a chemical catalyst/electrolyzer to the liquid used for producing hydrogen and oxygen.

Yet another object of the embodiments herein is to develop a HHO generating system in which a clear diamond is used as an insulator between the electrodes so as to absorb the heat generated by the electrodes.

Yet another object of the embodiments herein is to develop a HHO generating system in which a synthetic diamond doped with an impurity acts as a barrier between the electrodes to separate the hydrogen and oxygen gases produced.

Yet another object of the embodiments herein is to develop a HHO generating system in which the electrodes are placed in the HHO generating system in an improved sequential manner.

Yet another object of the embodiments herein is to develop a HHO generating system to produce methane gas along with HHO gas by adding bio-solids into the water-electrolyte solution of the HHO generating system.

These and other objects and advantages of the embodiments herein will become readily apparent from the following summary and the detailed description taken in conjunction with the accompanying drawings.

SUMMARY

The various embodiments herein provide a system for generating oxygen and hydrogen using electrolysis. The system comprises a container, a positive electrode frame, a negative electrode frame, a plurality of non conductive plastic frames, a plurality of non conductive rings, an electrolyte solution, and a plurality of disks. The electrolyte solution is pure water added with bio-solids. The plurality of disks comprises a plurality of positive electrode disks, a plurality of negative electrode disks and a plurality of neutral disks. The plurality of disks is arranged in a preset sequence such that a sequence starts and ends with a positive electrode disk or a negative electrode disk. The plurality of disks is made up of metals or non metals.

According to an embodiment herein, a metal is selected from a group consisting of a copper-nickel alloy, 316 L stainless steel, 347 L stainless steel, and Mixed Metal Oxide (MMO) coated metal disks, and wherein the metal is a copper-nickel alloy and wherein the cooper-nickel alloy disks comprises copper and nickel mixed in a ratio of 70:30 by weight.

According to an embodiment herein, a non-metal is selected from a group consisting of a fine grain graphite, graphene, carbon nano tubes or nano-carbon ribbon, MMO coated metal, Synthetic Blue diamond doped with boron, Synthetic polycrystalline diamond (PCD), and polycrystalline chemical vapor deposition (CVD) diamond.

According to an embodiment herein, the plurality of non conductive plastic frames is High-density Polyethylene (HDPE) frames and the plurality of non conductive rings is HDPE rings.

According to an embodiment herein, the plurality of disks comprises a plurality disks with holes, a plurality of disks with long slits and a plurality of dome shaped disks. The plurality of disks with holes is used as positive electrode disks and the plurality of disks with long slits is used as negative electrode disks. The plurality of dome shaped disks is used as positive or negative or neutral disks. The plurality of dome shaped disks is arranged in a concave shape and in a convex shape.

According to an embodiment herein, the preset sequence is selected from a first sequence or a second sequence or a third sequence. The first sequence is represented by [+NNNN−NNNN+NNNN−NNNN+]. The second sequence is represented by [−NNNN+NNNN−]. The third sequence is represented by $\{[-D_V D_X D_V D_X + D_V D_X D_V D_X-]$ or $[+D_V D_X D_V D_X - D_V D_X \ D_V D_X +]$ or [+NNNN+] or [−NNNN−]$\}$. Wherein + represents positive electrode disk, − represents negative electrode disk, N represents neutral, $D_V$ represents concave dome shaped disk and $D_X$ represents convex dome shaped disk.

According to an embodiment herein, the positive electrode frame is provided with a plurality of recesses to hold and support the plurality of positive electrode disks.

According to an embodiment herein, the negative electrode frame is provided with a plurality of recesses to hold and support the plurality of negative electrode disks.

According to an embodiment herein, the plurality of non conductive plastic frame is provided with a plurality of recesses to hold and support the plurality of neutral disks or the plurality of dome shaped disks or the plurality of positive disks and neutral disks.

According to an embodiment herein, the positive electrode frame and the negative electrode frame are covered with HDPE coating except on the recess areas that are configured to support and hold the positive electrode disks and the negative electrode disks.

According to an embodiment herein, the positive electrode disks and the negative electrode disks are provided with a plurality of hook like structures for fastening the positive electrode disks and the negative electrode disks respectively with the recesses in the positive electrode frame and the negative electrode frame.

According to an embodiment herein, the plurality of disks are supported in the container in such a manner that the plurality of disks is separated from one another by a preset distance, and the preset distance is within a range of 1/32 of an inch-1/4 of an inch.

According to an embodiment herein, the preset distance is preferably within a range of 1/16 of an inch.

According to an embodiment herein, the container is a HDPE container.

According to an embodiment herein, the plurality of positive electrode disks is designed to generate oxygen bubbles, when electricity is passed through the plurality of positive electrode disks.

According to an embodiment herein, the plurality of negative electrode disks is designed to generate hydrogen bubbles, when electricity is passed through the plurality of negative electrode disks.

According to an embodiment herein, the system further comprises a battery power supply. The battery power supply is connected to the positive electrode frame and the negative electrode frame to pass current to the positive electrode disks and the negative electrode disks.

According to an embodiment herein, the container is filled with bio-solids to generate methane, hydrogen and oxygen.

According to an embodiment herein, the bio-solids are selected from a group consisting of a final stage effluent of sewage treatment plant sludge. The final stage effluent of sewage treatment plant sludge comprises small particles of bacteria, algae and cow dung. The bacteria belong to algae family.

According to an embodiment herein, the system further comprises a plurality of extension tubes attached to the container, a plurality of one way valves fixed to the plurality of extension tubes, a top end cover, a flame arrestor and a plurality of hoses attached to the plurality of extension tubes.

According to an embodiment herein, the system is configured to be provided in infection waste incinerator in hospitals, and in fuel cells for cars, planes, boats, and rocket systems.

According to an embodiment herein, the system further comprises a barrier system for conducting electric charges and for separating the bubbles of oxygen and hydrogen. The barrier system comprises a barrier disk placed between the positive electrode disk and the negative electrode disk. The barrier disk is a synthetic Blue diamond disk coated or combined or doped with boron.

According to an embodiment herein, the positive electrode frame is provided with a first hole for receiving a nut to hold an electric wire from a positive electrode terminal of the battery power supply.

According to an embodiment herein, the negative electrode frame is provided with a second hole for receiving a nut to hold an electric wire from a negative electrode terminal of the battery power supply.

According to an embodiment herein, the system further comprises a lightning arrestor connected to the container. The lighting arrestor is arranged in the entire skin of an airplane/craft in a web shape or net shape. The lightning arrestor comprises a web formed with conductive diamond links or conductive diamond links with nano-carbon tubes or nano-carbon ribbon formed around the conductive diamond links to prevent lightning from damaging the airplane/craft and allows the lightning to travel around the airplane/craft composite skin.

According to an embodiment herein, the positive electrode disk and the negative electrode disk are coated with an electrical gel sealant to cover the positive electrode disk and the negative electrode disk.

According to an embodiment herein, the container is filled with water added with Potassium Hydroxide and synthetic blue diamond material. Potassium hydroxide is added to the water in the container by adding caustic Potash KOH flakes at a rate of 1/4 of a cup per gallon of water.

According to an embodiment herein, the system is provided with a clear diamond and the clear diamond is used as an insulator between the electrodes so as to absorb the heat generated by the electrodes.

According to an embodiment herein, the system is provided with a synthetic diamond doped with an impurity. The synthetic diamond doped with an impurity acts as a barrier between the electrodes to separate the hydrogen and oxygen gases produced.

According to an embodiment herein, the plurality of disks are coated with a corrosion prevention material, and wherein the corrosion prevention materials are coated in two layers, and wherein the plurality of disks are coated with a first layer of sea-salt material and a second layer of graphites or carbon nano tubes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
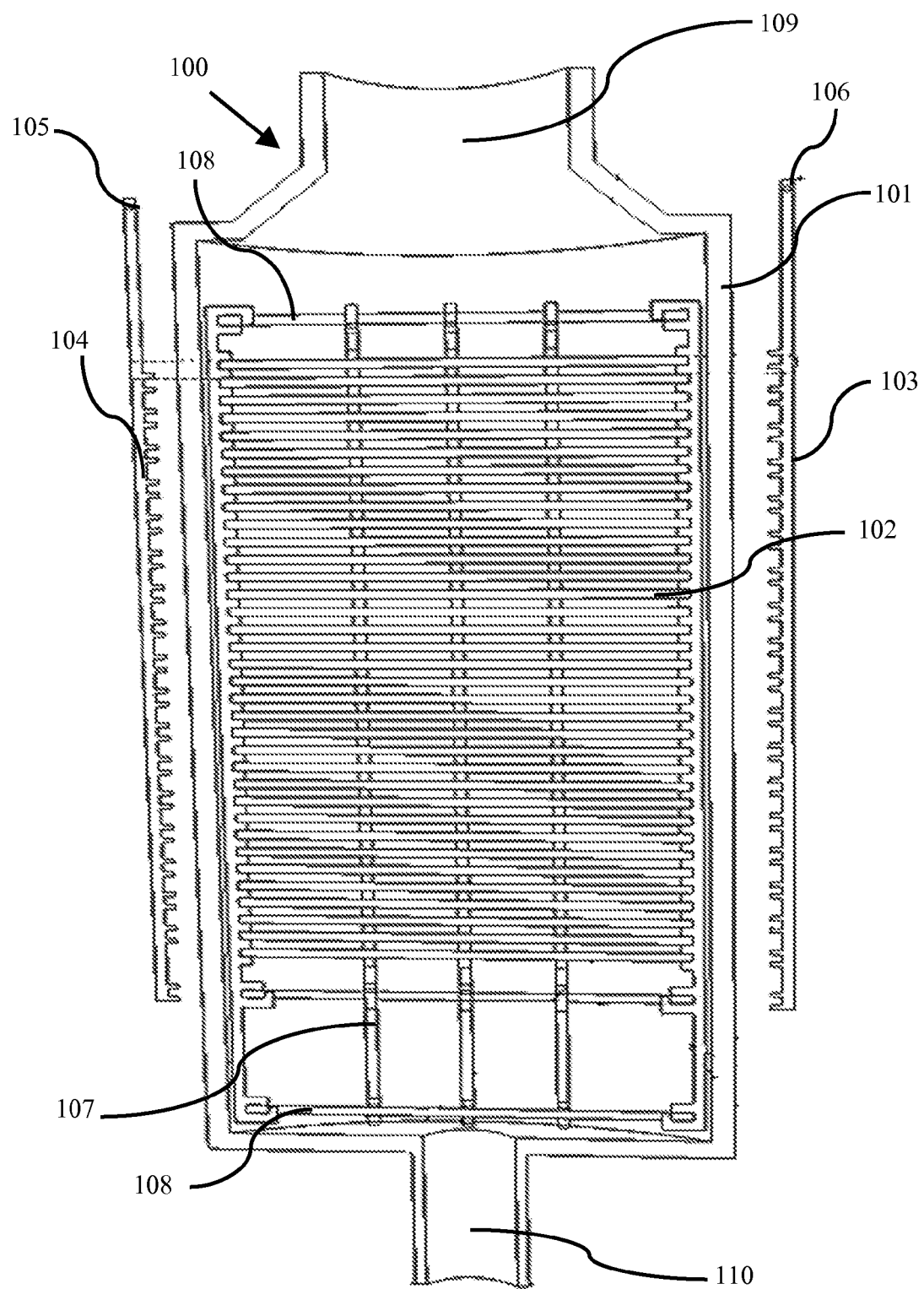
FIG. 1 illustrates a cutaway view of a HHO generating system without positive electrode and negative electrode frames attached to the disks, according to an embodiment herein.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for generating oxygen and hydrogen using electrolysis. The system comprises a container, a positive electrode frame, a negative electrode frame, a plurality of non conductive plastic frames, a plurality of non conductive rings, an electrolyte solution, and a plurality of disks. The electrolyte solution is pure water added with bio-solids The plurality of disks comprises a plurality of positive electrode disks, a plurality of negative electrode disks and a plurality of neutral disks. The plurality of disks is arranged in a preset sequence such that a sequence starts and ends with a positive electrode disk or a negative electrode disk. The plurality of disks is made up of metals or non metals.

According to an embodiment herein, a metal is selected from a group consisting of a copper-nickel alloy, 316 L stainless steel, 347 L stainless steel, and Mixed Metal Oxide (MMO) coated metal disks, and wherein the metal is a copper-nickel alloy and wherein the cooper-nickel alloy disks comprises copper and nickel mixed in a ratio of 70:30 by weight.

According to an embodiment herein, a non-metal is selected from a group consisting of a fine grain graphite, graphene, carbon nano tubes or nano-carbon ribbon, MMO coated metal, Synthetic Blue diamond doped with boron, Synthetic polycrystalline diamond (PCD), and polycrystalline chemical vapor deposition (CVD) diamond.

According to an embodiment herein, the plurality of non conductive plastic frames is High-density Polyethylene (HDPE) frames and the plurality of non conductive rings is HDPE rings.

According to an embodiment herein, the plurality of disks comprises a plurality disks with holes, a plurality of disks with long slits and a plurality of dome shaped disks. The plurality of disks with holes is used as positive electrode disks and the plurality of disks with long slits is used as negative electrode disks. The plurality of dome shaped disks is used as positive or negative or neutral disks. The plurality of dome shaped disks is arranged in a concave shape and in a convex shape.

According to an embodiment herein, the preset sequence is selected from a first sequence or a second sequence or a third sequence. The first sequence is represented by [+NNNN−NNNN+NNNN−NNNN+]. The second sequence is represented by [−NNNN+NNNN−]. The third sequence is represented by $\{[-D_VD_XD_VD_X+D_VD_XD_VD_X-]$ or $[+D_VD_XD_VD_X-D_VD_X\ D_VD_X+]$ or [+NNNN+] or [−NNNN−] Wherein + represents positive electrode disk, − represents negative electrode disk, N represents neutral disk, $D_V$ represents concave dome shaped disk and $D_X$ represents convex dome shaped disk.

According to an embodiment herein, the positive electrode frame is provided with a plurality of recesses to hold and support the plurality of positive electrode disks.

According to an embodiment herein, the negative electrode frame is provided with a plurality of recesses to hold and support the plurality of negative electrode disks.

According to an embodiment herein, the plurality of non conductive plastic frame is provided with a plurality of recesses to hold and support the plurality of neutral disks or the plurality of dome shaped disks.

According to an embodiment herein, the positive electrode frame and the negative electrode frame are covered with HDPE coating except on the recess areas that are configured to support and hold the positive electrode disks and the negative electrode disks.

According to an embodiment herein, the positive electrode disks and the negative electrode disks are provided with a plurality of hook like structures for fastening the positive electrode disks and the negative electrode disks respectively with the recesses in the positive electrode frame and the negative electrode frame.

According to an embodiment herein, the plurality of disks are supported in the container in such a manner that the plurality of disks is separated from one another by a preset distance, and the preset distance is within a range of $\frac{1}{32}$ of an inch-$\frac{1}{4}$ of an inch.

According to an embodiment herein, the preset distance is preferably within a range of $\frac{1}{16}$ of an inch.

According to an embodiment herein, the container is a HDPE container.

According to an embodiment herein, the plurality of positive electrode disks is designed to generate oxygen bubbles, when electricity is passed through the plurality of positive electrode disks.

According to an embodiment herein, the plurality of negative electrode disks is designed to generate hydrogen bubbles, when electricity is passed through the plurality of negative electrode disks.

According to an embodiment herein, the system further comprises a battery power supply. The battery power supply is connected to the positive electrode frame and the negative electrode frame to pass current to the positive electrode disks and the negative electrode disks.

According to an embodiment herein, the container is filled with bio-solids to generate methane, hydrogen and oxygen.

According to an embodiment herein, the bio-solids are selected from a group consisting of a final stage effluent of sewage treatment plant sludge. The final stage effluent of sewage treatment plant sludge comprises small particles of bacteria, algae and cow dung. The bacteria belong to algae family.

According to an embodiment herein, the system further comprises a plurality of extension tubes attached to the container, a plurality of one way valves fixed to the plurality of extension tubes, a top end cover, a flame arrestor and a plurality of hoses attached to the plurality of extension tubes.

According to an embodiment herein, the system is configured to be provided in infection waste incinerator in hospitals, and in fuel cells for cars, planes, boats, and rocket systems.

According to an embodiment herein, the system further comprises a barrier system for conducting electric charges and for separating the bubbles of oxygen and hydrogen. The barrier system comprises a barrier disk placed between the positive electrode disk and the negative electrode disk. The barrier disk is a synthetic Blue diamond disk coated or combined or doped with boron.

According to an embodiment herein, the positive electrode frame is provided with a first hole for receiving a nut to hold an electric wire from a positive electrode terminal of the battery power supply.

According to an embodiment herein, the negative electrode frame is provided with a second hole for receiving a nut to hold an electric wire from a negative electrode terminal of the battery power supply.

According to an embodiment herein, the system further comprises a lightning arrestor connected to the container. The lighting arrestor is arranged in the entire skin of an airplane/craft in a web shape or net shape. The lightning arrestor comprises a web formed with conductive diamond links or conductive diamond links with nano-carbon tubes or nano-carbon ribbon formed around the conductive diamond links to prevent lightning from damaging the airplane/craft and allows the lightning to travel around the airplane/craft composite skin.

According to an embodiment herein, the positive electrode disk and the negative electrode disk are coated with an electrical gel sealant to cover the positive electrode disk and the negative electrode disk.

According to an embodiment herein, the container is filled with water added with Potassium Hydroxide and synthetic blue diamond material. Potassium hydroxide is added to the water in the container by adding caustic Potash KOH flakes at a rate of $\frac{1}{4}$ of a cup per gallon of water.

According to an embodiment herein, the system is provided with a clear diamond and the clear diamond is used as an insulator between the electrodes so as to absorb the heat generated by the electrodes.

According to an embodiment herein, the system is provided with a synthetic diamond doped with an impurity. The synthetic diamond doped with an impurity acts as a barrier between the electrodes to separate the hydrogen and oxygen gases produced.

According to an embodiment herein, the plurality of disks are coated with a corrosion prevention material, and wherein the corrosion prevention materials are coated in two layers, and wherein the plurality of disks are coated with a first layer of sea-salt material and a second layer of graphites or carbon nano tubes.

The various embodiments herein provide a system and method for generating a plurality of reactant gases, particularly hydrogen and oxygen. The system adopts electrolysis process to generate a HHO gas from a water-electrolyte solution. The system is a reaction cell which comprises a plurality of electrodes emerged in the water-electrolyte solution. An electric power source connected to the electrodes is configured to supply an electric current so as to electrically charge the electrodes. The charged electrodes react with the water-electrolyte solution to produce the HHO gas.

FIG. 1 illustrates a cutaway view of a HHO generating system without positive electrode and negative electrode frames attached to the disks, according to an embodiment herein. With respect to FIG. 1, the HHO generating system 100 comprises a reaction tank 101 filled with water-electrolyte solution, a plurality of disks 102 stacked one above another, a plurality of frames connecting to the disks and an external power supply. The plurality of disks 102 comprises a plurality of conductive disks and non conducting disks. The conductive disks are negatively charged cathode disks and positively charged anode disks. The non-conductive disks are placed in between the positively charged disks and the negatively charged disks. The plurality of frames comprises a plurality of conductive frames 103 and 104 and a plurality of support frames 107 and 108 configured to hold the disks. The external power supply connected to the conductive frames 103 and 104.

Figure 2:
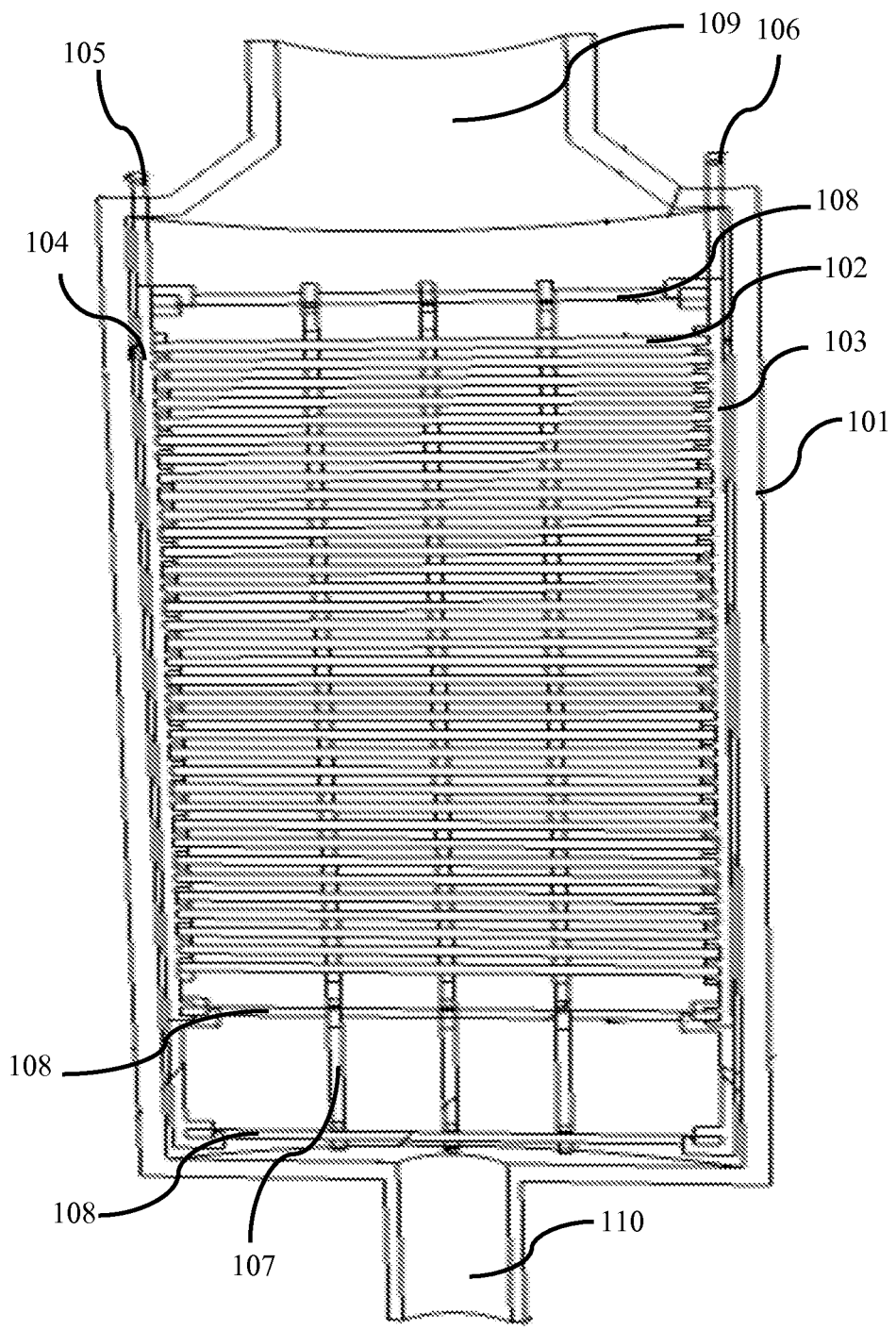
FIG. 2 illustrates a sectional view of a HHO generating system with positive connection and negative electrode frames attached to the respective disks, according to an embodiment herein.

FIG. 2 illustrates a sectional view of a HHO generating system with positive connection and negative electrode frames attached to the respective disks, according to an embodiment herein. A negative potential of the power supply is connected to a negative terminal 105 of an N-connection frame 104 to negatively charge the disks connected to the frame. A positive potential of the power supply is connected to a positive terminal 106 of a P-connection frame 103 to positively charge the disks connected to the frame.

According to an embodiment herein, the system is provided with tube/container in which the disk and frame arrangement are provided inside. The arrangement is secured to a position using a plurality of fastening extensions attached to the container. The tank further comprises at least one hose through which the HHO gas exits the system. The opening of the hose pipe is sealed with a cap. The cap and the pipe opening are bonded by a melting type bonding agent or by applying heat to each other so as to maintain the seal. The tank further comprises a plurality of valves, out of which at least one valve is adopted to supply the water-electrolyte solution to the HHO generator system. The tank is constructed from a high density non-conductive material, for example, preferably High-density Polyethylene (HDPE) material.

According to an embodiment herein, the tank is filled with the water-electrolyte solution which is decomposed by the electrolysis process to produce the HHO gas. Pure water or distilled water is used as the electrolyte in the electrolysis process. The water is mainly used to produce HHO as the pure water is safer than using chemicals, coal or methane. The water is decomposed with zero waste and toxic byproduct. The electrolysis of pure water requires excess energy in the form of over potential to overcome various activation barriers. The efficiency of electrolysis is increased through the addition of an electrolyte (such as a salt, an acid or a base) and the use of electro-catalysts. The catalysts modify and increase the rate of chemical reactions without being consumed in the process. Strong acids such as sulfuric acid ($H_2SO_4$) and strong bases such as potassium hydroxide (KOH), and sodium hydroxide (NaOH) are frequently used as electrolytes due to their strong conducting abilities. The electro-catalysts that are used in the process are conductive materials, not limiting to, 316 L stainless steel, 347 L stainless steel, fine grain graphite, Graphene, nano-carbon tubes or nano-carbon ribbon, MMO coated metal, Synthetic Blue diamond doped with boron, Synthetic polycrystalline diamond (PCD), polycrystalline CVD (chemical vapor deposition) diamond and the like. The conductive materials are used in a powder form as an electro-catalyst in the water for gas formation. The water is added preferably with Potassium Hydroxide caustic Potash KOH flakes as catalyst.

The disks are assembled one above another to form a stacked disk arrangement. The disks used are of any shape for example: flat disks, rectangle disks, square disks, domed shaped plates with rims or edges and wires. The plurality of disks comprises the conductive disks which act as electrodes in the electrolysis process. The stack arrangement further comprises the non-conductive disks which are placed in between the conductive disks to provide insulation. The stacked arrangement is further braced by the plurality of frames which are placed on the circumference of the disk arrangement.

The conductive disks are made of highly superconductive material to allow a large amount of electric current to flow from the disks to the water. The materials that are used for manufacturing the conductive disks include, but not limited to, 316 L stainless steel, 347 L stainless, fine grain graphite, Graphene, nano-carbon tubes or nano-carbon ribbon, MMO coated metal, Synthetic Blue diamond doped with boron, Synthetic polycrystalline diamond (PCD) diamond, polycrystalline CVD (chemical vapor deposition) diamond and the like materials.

The conductive disks comprises of a plurality of cathode disks and a plurality of anode plates. The external power supply is connected to the conductive disks to electrically charge the disks. The cathode disks are negatively charged disks whereas the anode disks are positively charged disks. When the electric current is passed through the cathode and anode disks, the disks reacts with the water-electrolyte solution to produce the HHO gas bubbles. The electric current travelling through the disks move along the disk surface, thus creating more surface area at a best distance for the parallel surfaces at 90 degrees. The parallel arrangement of charged disk surface works best to produce the HHO gas. The problems that are encountered due to a use of disks to generate HHO gas are the amount of heat produced during the electrolysis process and transfer of the bubbles out of the electrolyte solution to the top of the reaction tank without igniting the bubbles and/or over-pressurizing the tank/container. The holes and slits that are formed on the conductive disks allow the bubbles to move up and out of the tank. The slots and holes on the disks further helps in lowering the temperature of the disks and the water.

Figure 3:
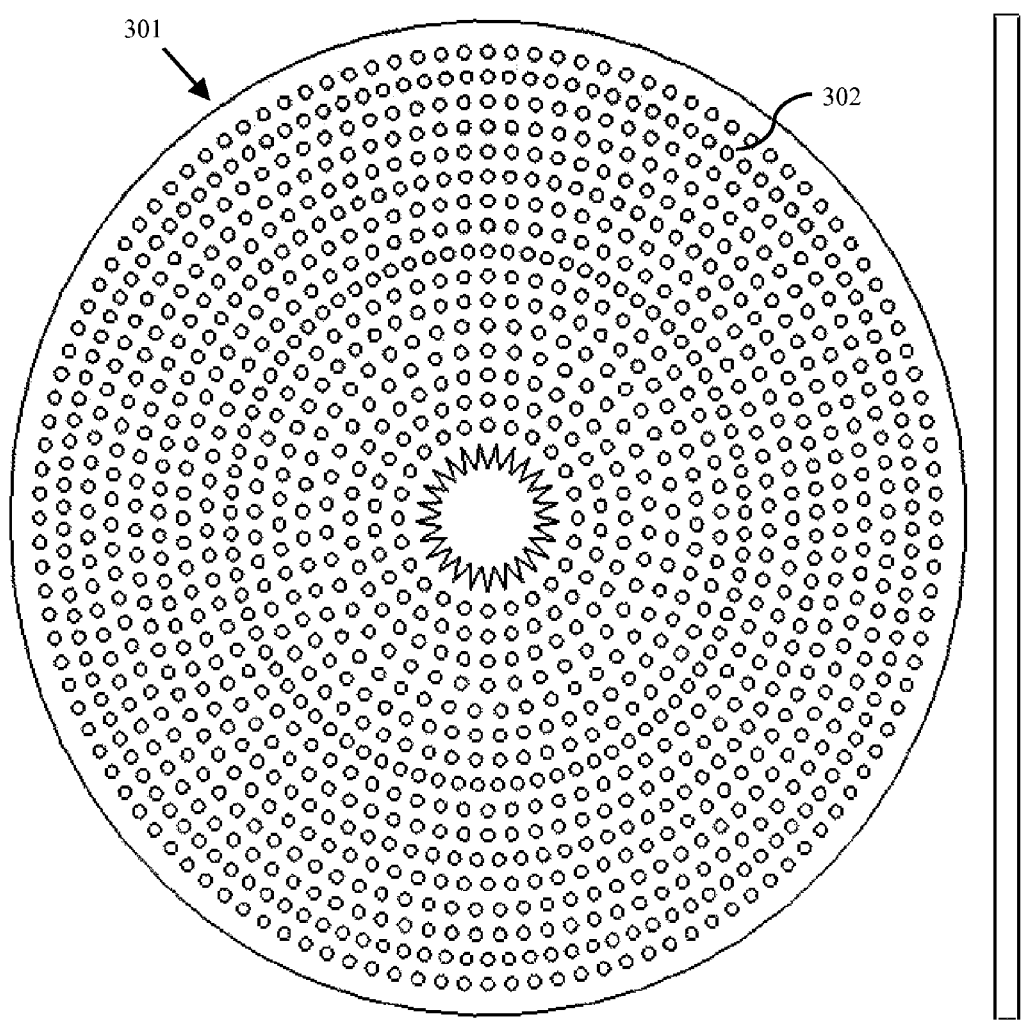
FIG. 3 illustrates a top view and a side view of an anode disk with a plurality of holes in the HHO generating system, according to an embodiment herein.
Figure 4:
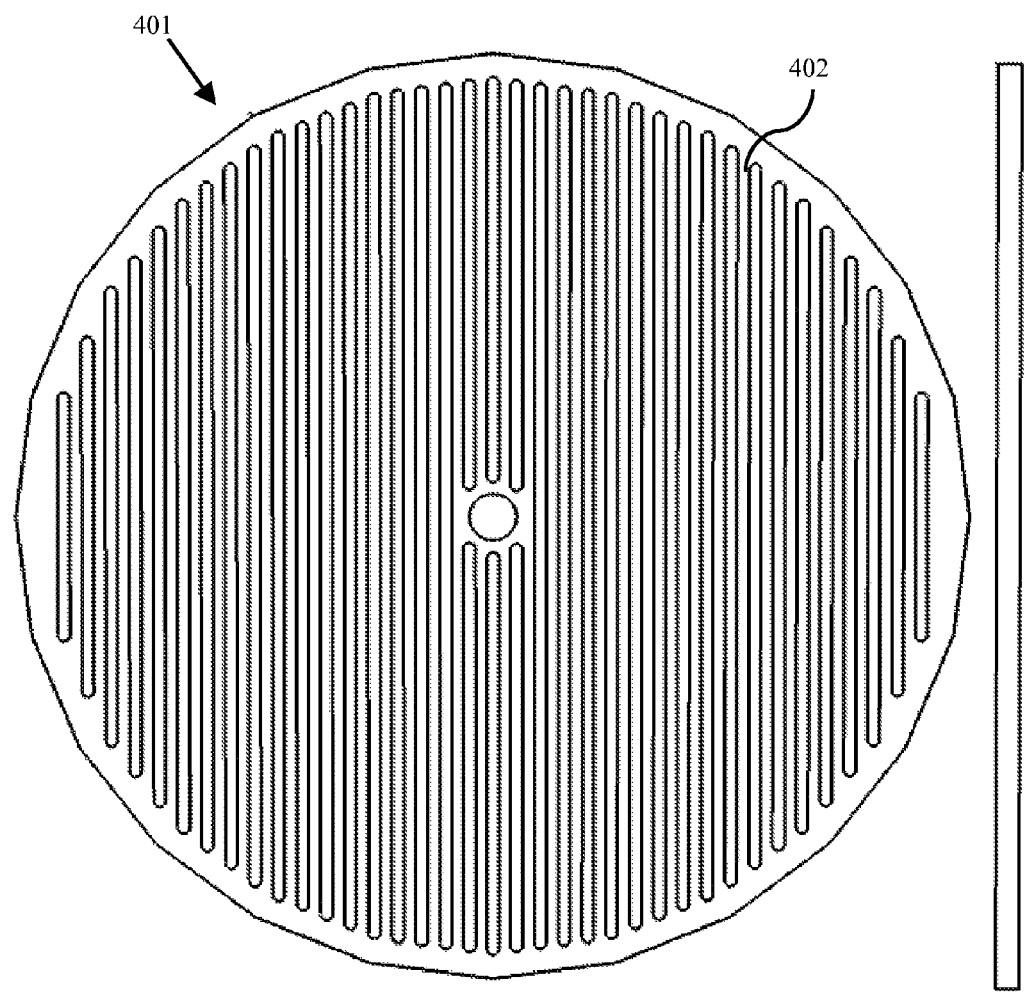
FIG. 4 illustrates a top view and a side view of a cathode disk with a plurality of slits in the HHO generating system, according to an embodiment herein.

FIG. 3 illustrates a top view and a side view of an anode disk with a plurality of holes in the HHO generating system, according to an embodiment herein, while FIG. 4 illustrates a top view and a side view of a cathode disk with a plurality of slits in the HHO generating system, according to an embodiment herein. The disks with holes 302 are best used as positively charged electrode disks. Hence the anode disks 301 comprise a plurality of holes 302. Since the slit disks are best used as negatively charged disks, the cathode disks 401 comprise a plurality of slits 402. The disks with holes 301 have a greater mass, for transferring more electricity in the water. The disks draw a greater of current when a material with the least ohms reading is used for manufacturing disks and the heat generated by the disk is less.

The electrolysis process corrodes the electrode disks used in the process. The corrosion is a barrier for further damage from further corrosion. Hence the conductive disks are coated with non-corrosive substance to eliminate an effect of corrosion and to increase an electric current conductivity in the disks. The coating of disks is explained considering an example. Considering the metal used for the conductive disks to be 70/30 Copper/Nickel meaning 70% copper & 30% nickel. The treatment for corrosion of the disks is not needed when only the distilled water is used in the tank. Since the electro-catalyst is used with the distilled waiter for electrolysis, the disks need to be coated with a highly conductive material. To form the coating, the metal disks are placed in a solution of distilled water added with sea salt. The disks are left immersed in the sea salt solution for a pre-determined period of time, for example 30 days, so as to allow a crystal salt attachment to the 70/30 Copper/Nickel disk. The same sea salt solution is added with the nano-carbon tubes or graphite powder to produce a new solution. The disks coated with the crystal salt attachment are again immersed in the newly formed solution for a predetermined period of time, for example 30 days. The disks are further covered/coated with a different crystal salt attachment. During a first phase of immersion, the sea salt bonds to the disks, thereby providing a first layer of coating. By further bonding the small particles of graphite/nano-carbon tubes to the sea salt attached to the disks, a second protection layer is formed to lessen the effect of corrosion. The graphite attached to the disks further slows down the flow of electricity on the surface of the disks so as to produce a greater amount of Hydrogen and Oxygen from the water.

It is noticed during electrolysis that the anode electrode corrodes until it is ruptured. So the anode disk needs to be coated with Mixed Metal Oxide [MMO] Anode Coating. The Mixed Metal Oxide [MMO] Anode Coating is a crystalline electrically conductive coating to prevent rusting and corrosion of the anode disks. Since the coating is conductive, the anode disk works perfectly for hydrogen and oxygen production. The highly conductive synthetic blue diamond is mixed into the coating material and the material is bonded to the conductive disk which is to be used as anode. The coating material is bond to high conductive disk through a bonding material (like super glue, 100% Methyl Cyanoacrylate Adhesive etc.).

The synthetic diamond is polycrystalline diamond (PCD) which has extremely high electric conductivity and thermal conductivity. The high conductivity synthetic blue diamond doped with boron is used prominently to replace the stainless steel or copper/nickel disks and MMO metal disk so as to be used as an anode. Alternatively, the metal disks like aluminum which produce toxic gases are coated with blue diamond so eliminate the generation of the toxic gas.

According to an embodiment herein, a plurality of neutral disks is arranged in between the positively charged disks and the negatively charged disks. The neutral disks are mainly used for transferring the heat generated by electricity flowing through the disks and the water. The number of neutral disks placed in between the conductive plates depends on the amount of electric current flowing through the plates. A natural diamond is a perfect non-conductive material and thus it is used for manufacturing the neutral disks. The natural diamond is used for both heating and cooling purposes.

According to an embodiment herein, the pluralities of disks are arranged in a sequence of positive, neutral and negative disks. The measurement of spacing between the disks is important for the hydrogen/oxygen to be formed. The typical minimum spacing usually used is $\frac{1}{32}$" and the maximum spacing is $\frac{1}{4}$" maximum with best spacing of $\frac{1}{16}$" apart. For best performance, the thickness of disk material is equal to the width of the spacing/gap between the disks/plates. The disks are stacked in a column in a sequence of positive and negative disks, back and forth, to start and end with a positive/negative disks. The electricity is supplied to the disks by connecting the positive and negative electrode frames to the respective disks in the sequence. The arrangement of disks is explained with an example: Considering a few symbols to represent the sequencing of the disks where a positive charged disk is '+', a negative charged disk is '−' and a neutral disk is 'n', then the arrangement of disks can be (+nnnn−nnnn+nnnn−nnnn+) or (−nnnn+nnnn−nnnn+nnnn−). For the aforementioned arrangement, each neutral plate must be about 1.2 to 1.4 Amps, so more number of neutral plates are added to lower the current to 1.2-1.4 Amps, when the power supply of 12 volts or 24 volts (or even more volts) is used. The conductive material allows more current through it, thereby allowing more Amps per disk to flow through, when the dome disk with rim is used for an amplifier.

Figure 5:
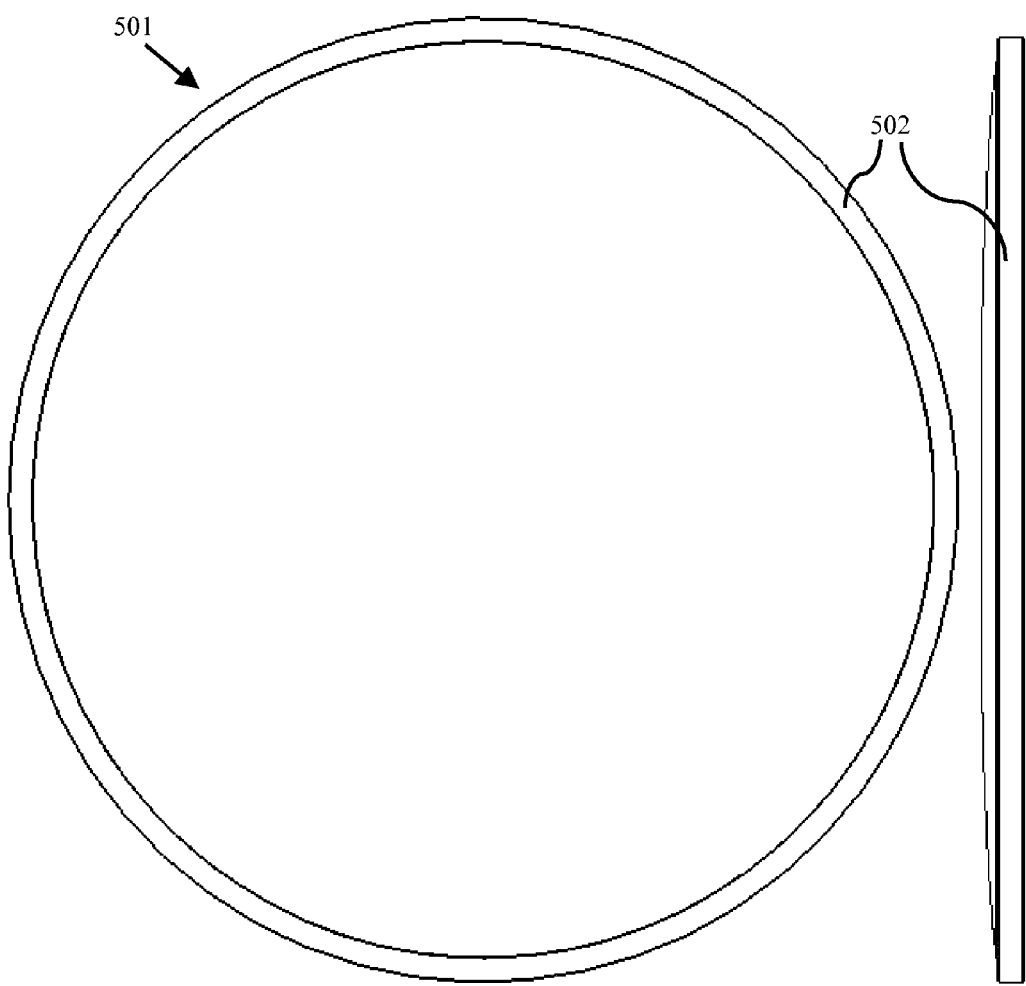
FIG. 5 illustrates a top view and a side view of a dome shaped neutral, positive or negative disk in the HHO generating system, according to an embodiment herein.

FIG. 5 illustrates a top view and a side view of a dome shaped neutral disk in the HHO generating system, according to an embodiment herein. The dome disk 501 with rim 502 is manufactured with the polycrystalline CVD (chemical vapor deposition) diamond using 13.5 kHz or greater frequencies. The symbols representing a side view of the Dome disk 501 with the direction of dome radius are "(" and ")". Thus the sequencing of the disk arrangement is: +( ) ( )− or −( ) ( )+ ( )( )− or +( ) ( )− ( )( )+ or +−+−+−+− or have the dome shape in the same direction, like (((((((((((.

Figure 6:
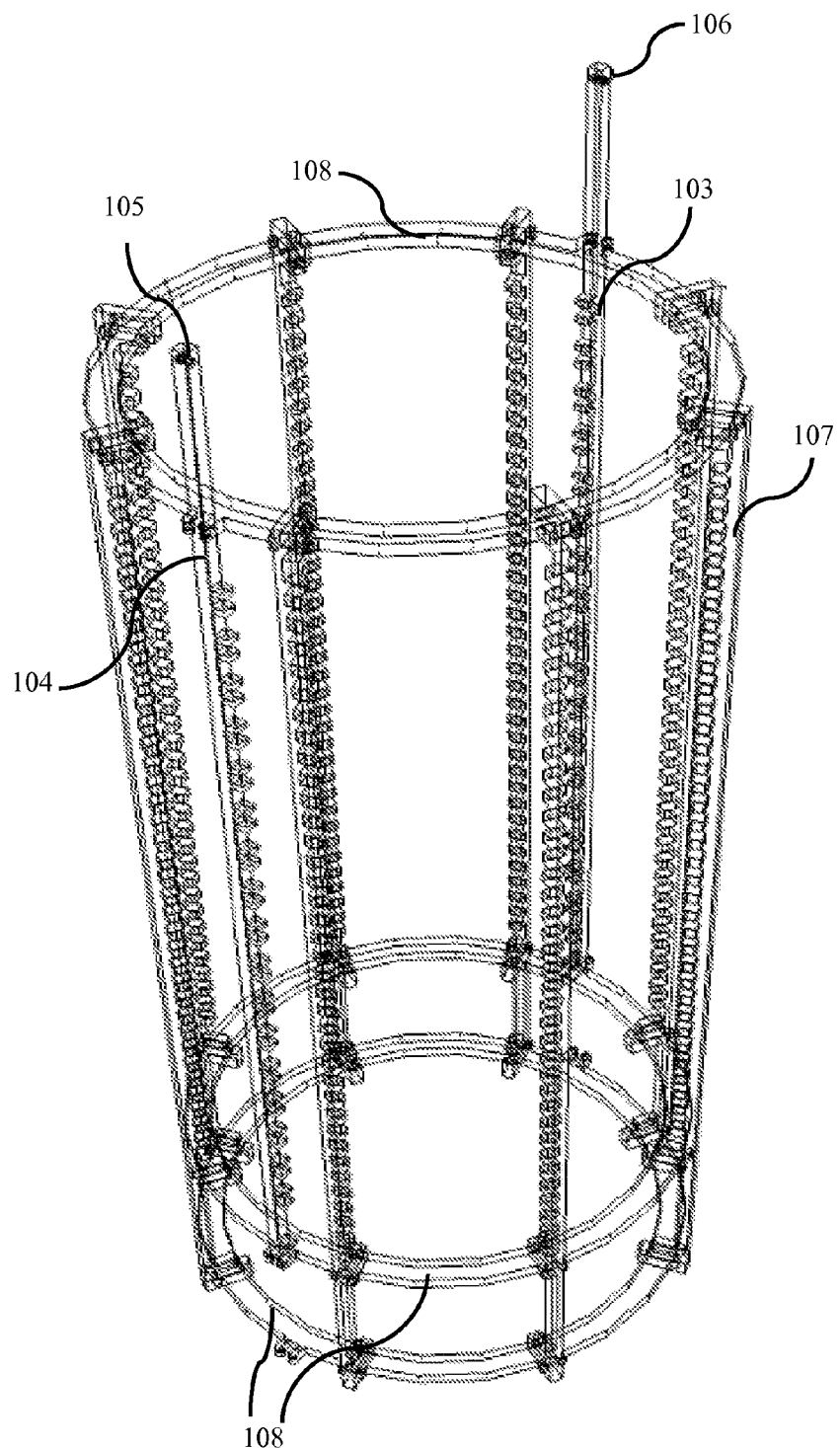
FIG. 6 illustrates a perspective view a frame structure for holding the disks in the HHO generating system, according to an embodiment herein.

FIG. 6 illustrates a top side perspective view a frame structure for holding the disks in the HHO generating system, according to an embodiment herein. The frames comprises at least two conducting frames 104 and 103, of which at least one frame is the negative electrode conducting (N connection) frame 104 connected to the cathode disks and one positive electrode conducting (P connection) frame 103 connected to the anode disks.

Figure 7:
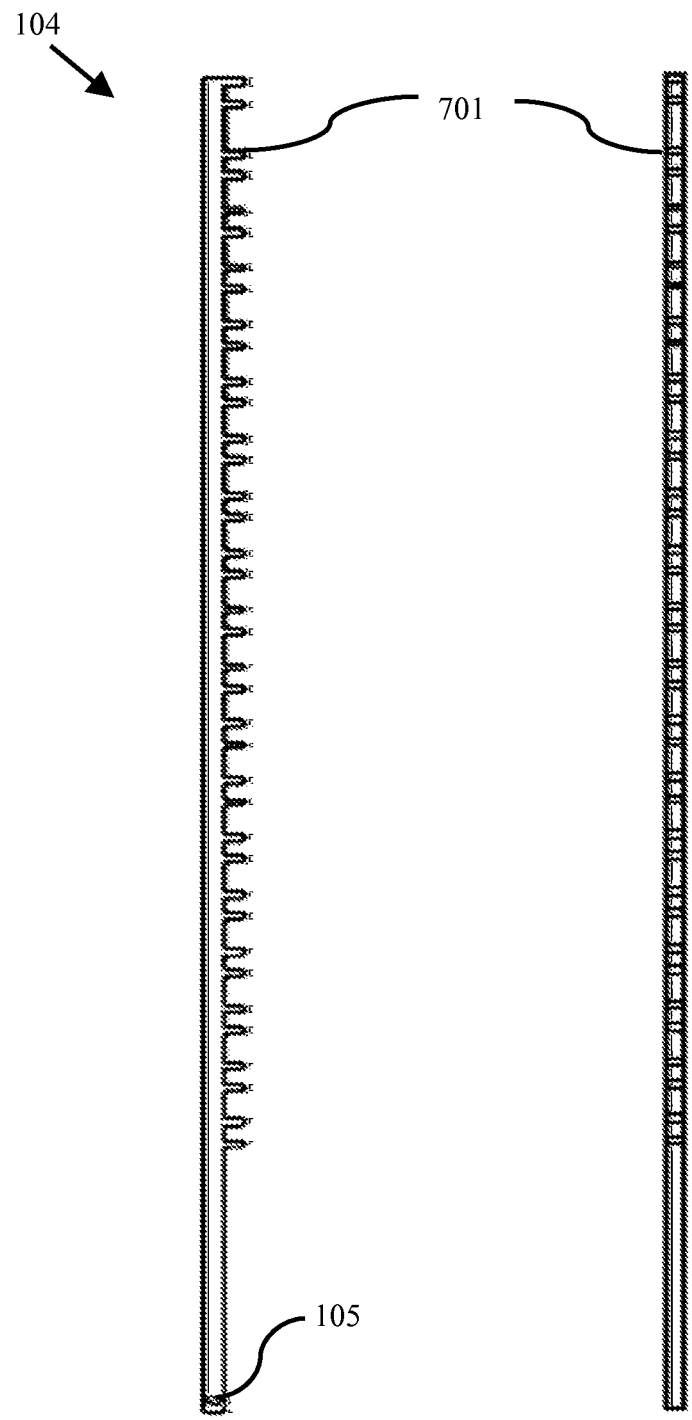
FIG. 7 illustrates a side view and a front view of a negative electrode frame in the HHO generating system, according to an embodiment herein.
Figure 8:
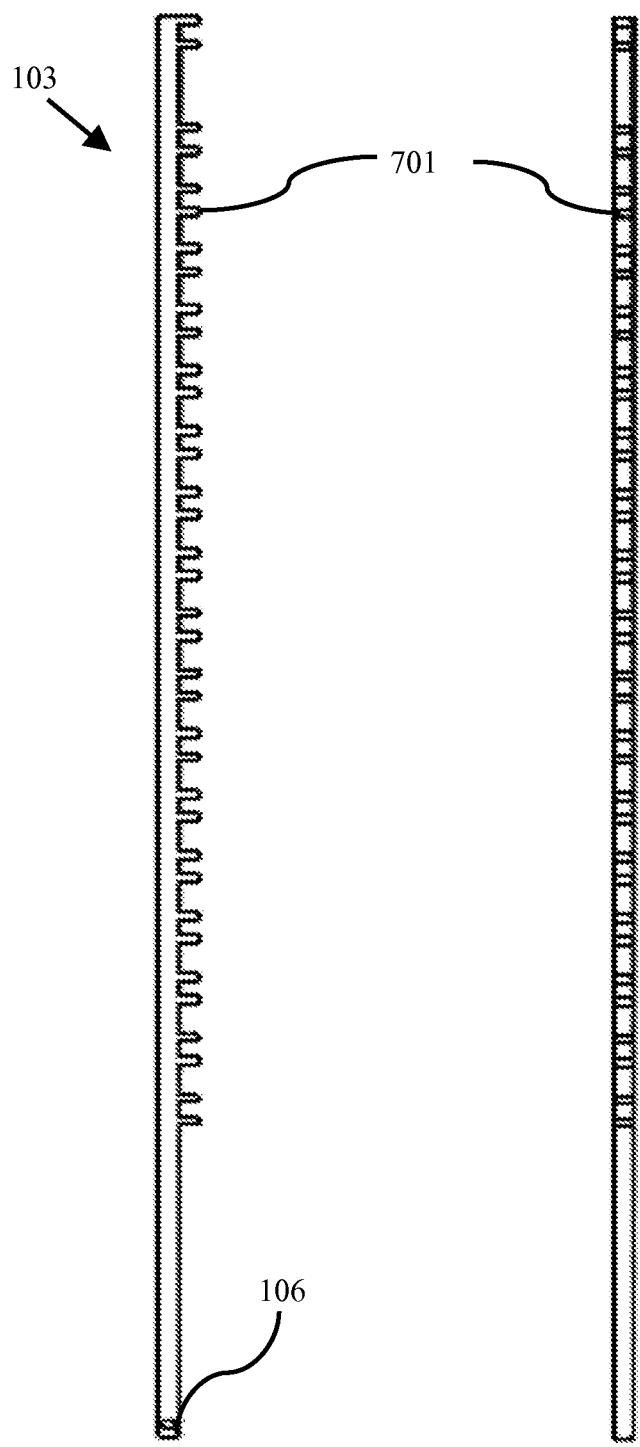
FIG. 8 illustrates a side view and a front view of a positive electrode frame in the HHO generating system, according to an embodiment herein.

FIG. 7 illustrates a side view and a front view of a negative electrode frame in the HHO generating system, according to an embodiment herein, while FIG. 8 illustrates a side view and a front view of a positive electrode frame in the HHO generating system, according to an embodiment herein. The two frames 104 and 103 carry electricity from the outside area of the tank to the water-electrolyte solution filled in the tank. Each frame comprises a plurality of measured slots 701 positioned as per the spacing of the disks that are to be pressed into each slot 701. Both the conducting frames 104 and 103 are not attached to the same disk. The slots 701 of both the frames 104 and 103 are arranged in such a way that the negative charged disk is connected only to a slot 701 on the N-connection frame 104. The following positive charged disk is connected only to a slot 701 on the P-connection frame 103. The conducting frames 104 and 103 are made of 70% copper and 30% nickel. Other conductive materials that are used for constructing frames include, but not limited to, high conductive synthetic Blue diamond doped with boron, Stainless Steel, particularly 316 L stainless steel, 347 L stainless steel, fine grain graphite, Graphene and MMO. The positive terminal of the power supply is connected to a connecting terminal 106 at an end of the P-connection frame 103. The negative terminal of the power supply is connected to a connecting terminal 105 at an end of the N-connection frame 104. The frames further comprises the plurality of non-conducting support frames. The frames are made of highly insulating material such as High-density Polyethylene (HDPE) material. The support frames are configured to hold the plurality of conducting disks. The support frames are connected on the circumference of the disk arrangement so as to envelope the plurality of disks. The support frames further comprises at least three non-conducting rings.

Figure 9:
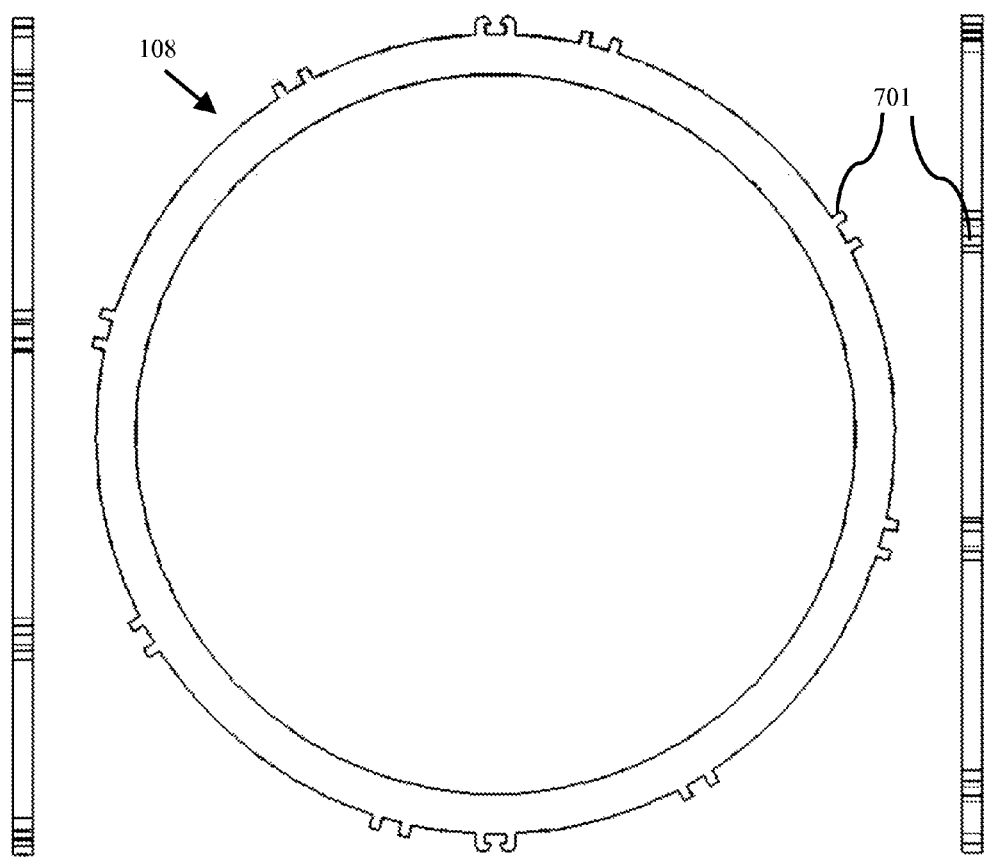
FIG. 9 illustrates a top view and a side view of a circular ring frame in the HHO generating system, according to an embodiment herein.

FIG. 9 illustrates a top view and a side view of a circular ring frame in the HHO generating system, according to an embodiment herein. The rings 108 are used to hold and support the conducting frames and the non-conducting frames with the help of the slots 701 provided on the circumference of the rings. The support ring frames 108 are constructed from non-conducting High-density Polyethylene (HDPE) material.

Each frame that conducts electricity is coated with a non-conductive material such as High-density Polyethylene (HDPE) with exception of the frames parts which connect to the conducting disks. The frame parts which are not coated with HDPE are the locations where the frames are attached to the electric conductive disks. The non-conductive coating is applied on the conducting frames so that the electric current exclusively enters the water from the disks and not from the conductive frames.

Figure 10:
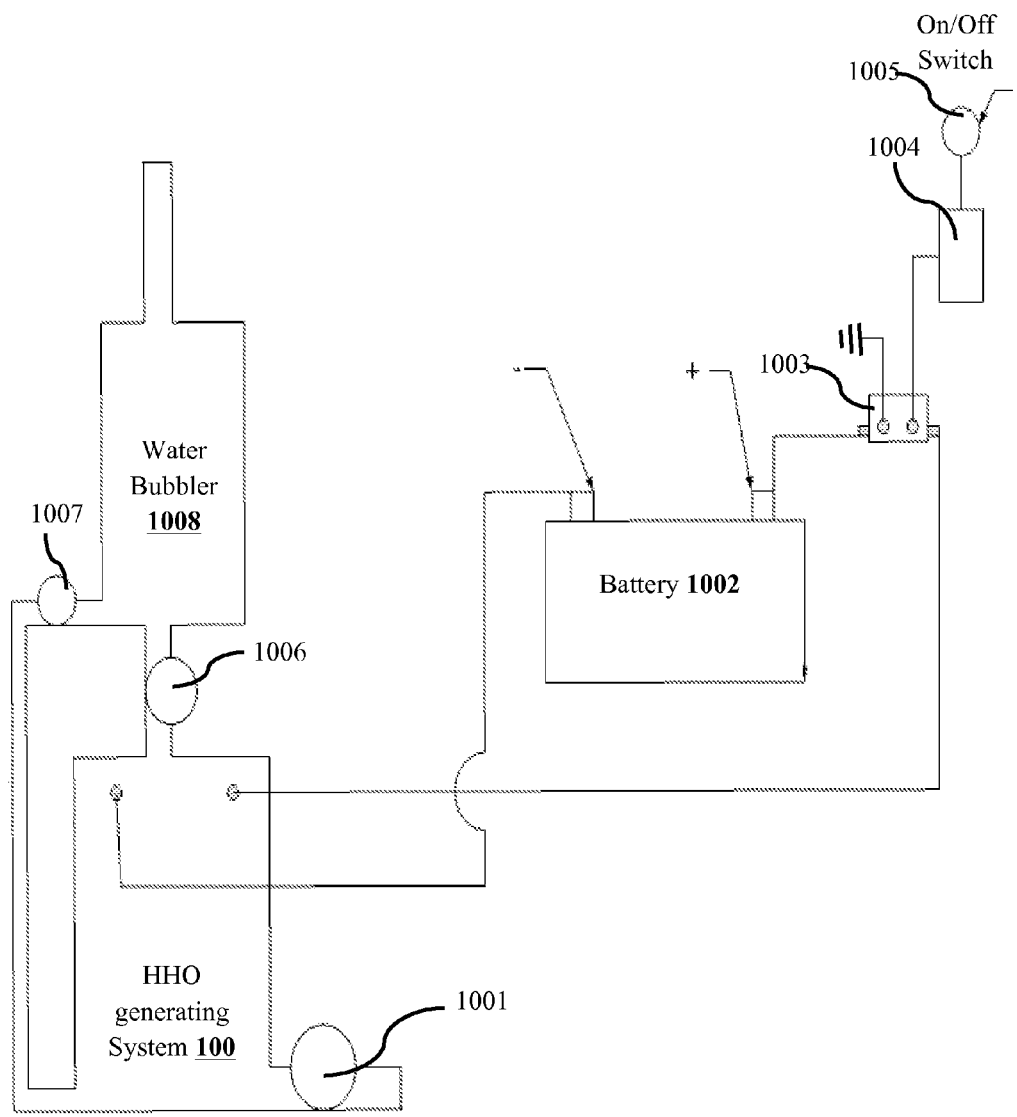
FIG. 10 illustrates a functional block diagram of a HHO generating system in an automobile, according to an embodiment herein.

FIG. 10 illustrates a functional block diagram of a HHO generating system in an automobile, according to an embodiment herein. The block diagram of the system shows a wiring configuration of the HHO generator 100 on automobiles like cars, trucks, vehicles and electric generators. The HHO generating system 100 is configured for a production of HHO gas at gas stations so that a person uses the system to fill the vehicle gas tank with HHO. A lightning bolt is passed through the HHO generator 100 to increase generation of the HHO gas. A fuse 1004 of preferably 15 Amps is used to control the lightning bolt through the power supply 1002 to the generator 100. A Solenoid 1003 connected to the fuse 1004 is configured to establish a connection between the battery 1002 to the HHO generation system 100 according to the operation of an on/off switch 1005. The external power supply 1002 is connected to the conductive disks so as to electrically charge the disks in the HHO generation system 100. The negative potential of the power supply is connected to the cathode disks to negatively charge the disks. The positive potential of the power supply is connected to the anode disks to positively charge the disks. The HHO generator 100 is filled with water containing electrolyte for enabling the electricity to pass through. A valve 1001 is provided at the bottom of the HHO generator, through which the water-electrolyte solution is supplied. The cathode disks produce hydrogen molecules from the water-electrolyte solution whereas the anode disks produce oxygen molecules from the water-electrolyte solution. The hydrogen and oxygen gases reach the top of reaction cell in the form of bubbles. The amount of hydrogen and oxygen generated is proportional to the total electrical charge conducted by the water-electrolyte solution. The HHO gas bubbles pass through the hose 1006 of the reaction cell in the HHO generator and are collected at a water bubbler 1008. The water bubbler 1008 is configured to separate the hydrogen gas and the oxygen gas bubbles. The collected gas bubbles contain traces of water and electrolyte along with the gases. The water bubbler 1008 is further configured to clean the HHO gas with the help of chemicals. The water and electrolyte collected in the water bubbler 1008 is returned back to the HHO generation system through a valve 1007 connecting the water bubbler 1008 and the HHO generator 100. The use of chemicals is replaced with a flame arrester for cleaning the HHO gas. Sound wave pulses and/or diamond tube microwaves are applied to the reaction cell containing the electricity charged disks so as to help the bubble formation and to produce an increased amount of hydrogen and oxygen.

According to one embodiment herein, sound wave pulses are added to the cylinder/pipe containing the electricity charged disks to help the bubble formation. The diamond tube microwaves are also used to make more hydrogen and oxygen.

Figure 11:
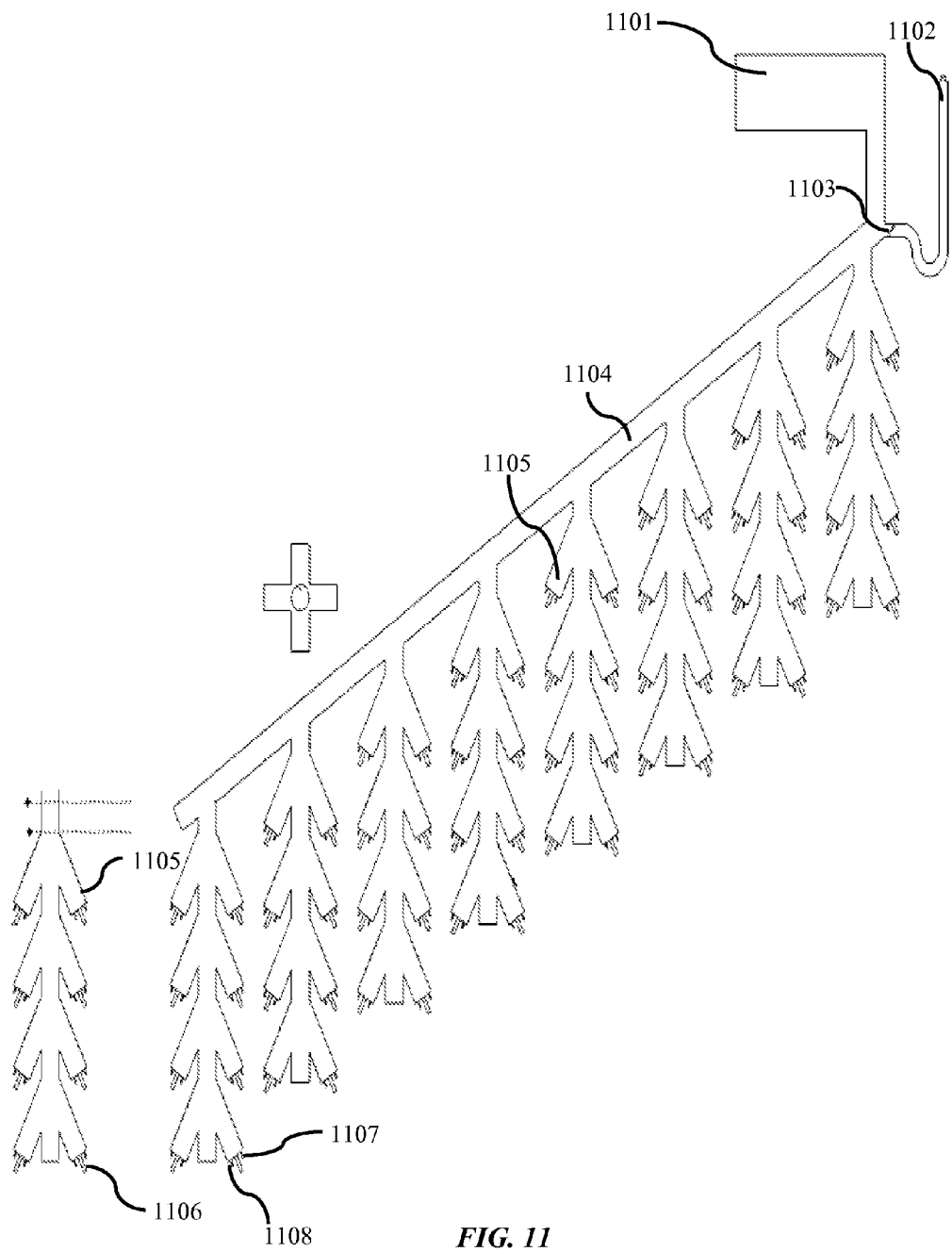
FIG. 11 illustrates a schematic block diagram of a large hydrogen and oxygen manufacturing plant, according to an embodiment herein.

FIG. 11 illustrates a schematic diagram of a large hydrogen and oxygen manufacturing plant, according to an embodiment herein. The manufacturing plant comprises a plurality of HHO generating systems, which are connected to a pipe tree 1105 to form of a tree-like structure. A plurality of outlet valves emerging from the plurality of HHO generating systems is configured to merge into the single pipe tree 1105. The pluralities of tree pipes 1105 are connected in series to a common angled pipe 1104. The angled pipe 1104 is configured to collect the HHO gas generated from the plurality of HHO generators. Since the common pipe 1104 is inclined at a particular angle, the collected HHO gas rises at top of plant and is collect at a common water bubbler 1101. The water bubbler 1101 is configured to separate the hydrogen gas and the oxygen gas, wherein the gases are stored in separate tanks. The gases are also configured to be stored as liquid hydrogen and liquid oxygen. The manufacturing plant further comprises a common water inlet pipe 1102 with a threaded cap. The pipe 1102 is an entry point for supplying the water-electrolyte solution to the plurality of HHO generating systems. The pipe 1102 further comprises a one way valve 1103 for allowing the flow of water. Each pipe tree 1105 comprises a central pipe 1106 with one way valve for supplying water to the respective HHO generator. The pipe tree 1105 further comprises a positive electricity connection 1107 and a negative electricity connection for each HHO generator 1108.

Figure 12:
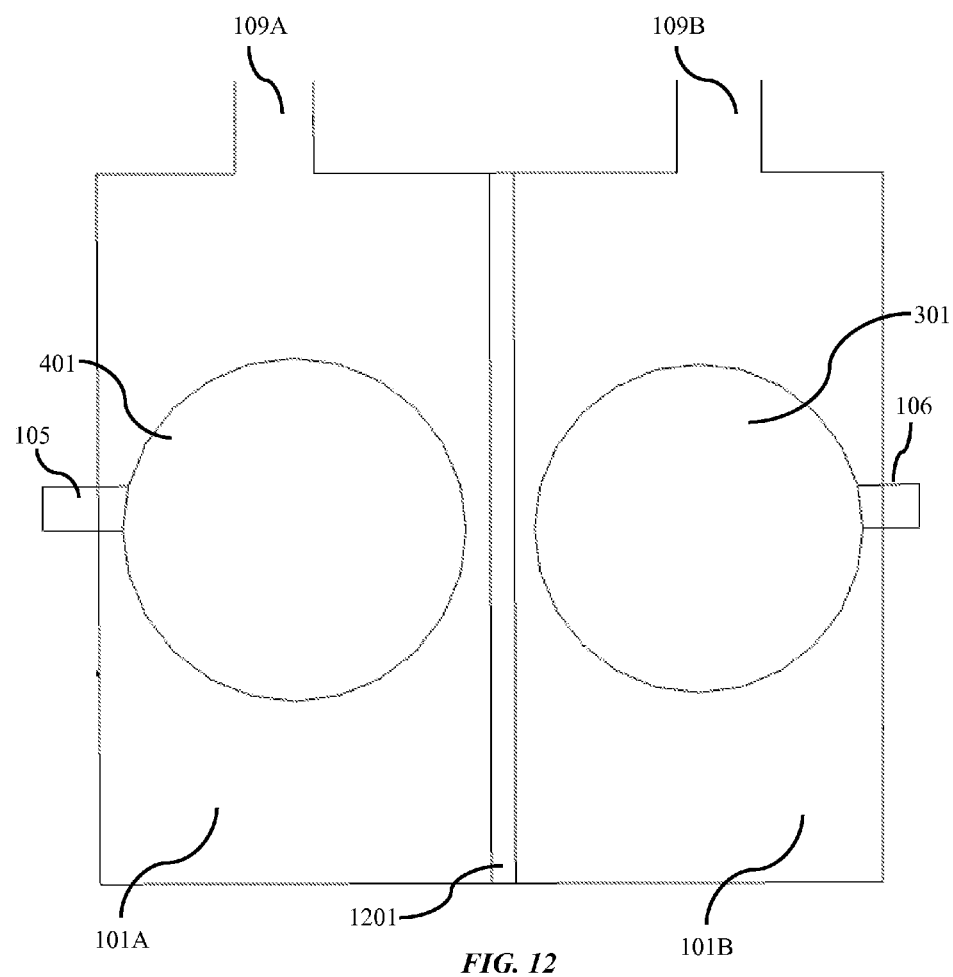
FIG. 12 illustrates a block diagram of a HHO generating system with a barrier for separately producing the hydrogen gas and the oxygen gas, according to an embodiment herein.

FIG. 12 illustrates a schematic diagram of a HHO generating system with a barrier for separately producing the hydrogen gas and the oxygen gas, according to an embodiment of the herein. In order to separately collect the oxygen gas and the hydrogen gas, a barrier 1201 of highly conductive synthetic diamond plate doped with boron is constructed/arranged between the positive charged disks 301 and negative charged disks 401. Other conductive materials that are used for constructing the barrier include, but not limited to, highly conductive synthetic Blue diamond material doped with boron, Stainless Steel, particularly 316 L stainless steel, 347 L stainless steel, fine grain graphite, Graphene and MMO. The barrier 1201 separates the reaction tank into two sections, first tank section 101A and second tank section 101B. The negative terminal 105 of power supply is connected to the plurality of negatively charged disks 401 of the first Tank section 101A and the positive terminal 106 of the power supply is connected to the plurality of positively charged disks 301 of the second Tank section 101B. The electric current travels through the water from the positive charged disks 301 to electrify the barrier 1201. The barrier 1201 further conducts the electric current to the negative charged disks 401 through the water. The first tank section 101A provided with the negative charged disks 401 generates the hydrogen gas bubbles whereas the second tank section 101B provided with the positive charged disks 301 generates the oxygen gas bubbles. The barrier 1201 in the reaction tank 101 totally separates the bubbles of the oxygen gas and the hydrogen gas. The gases reach the top of tank sections and the gases are separately collected through the two hoses 109A and 109B.

According to an embodiment herein, a wire/cable made of synthetic diamond with high strength and capable of conducting high voltage current and amps is wound around the disks The wire/cable is manufactured of carbon-nano tubes which links the diamond in a linear manner. Other conductive materials that are used for constructing the wire/cable include, but not limited to, highly conductive synthetic Blue diamond doped with boron, Stainless Steel, particularly 316 L stainless steel, 347 L stainless steel, fine grain graphite, Graphene and MMO.

Figure 13:
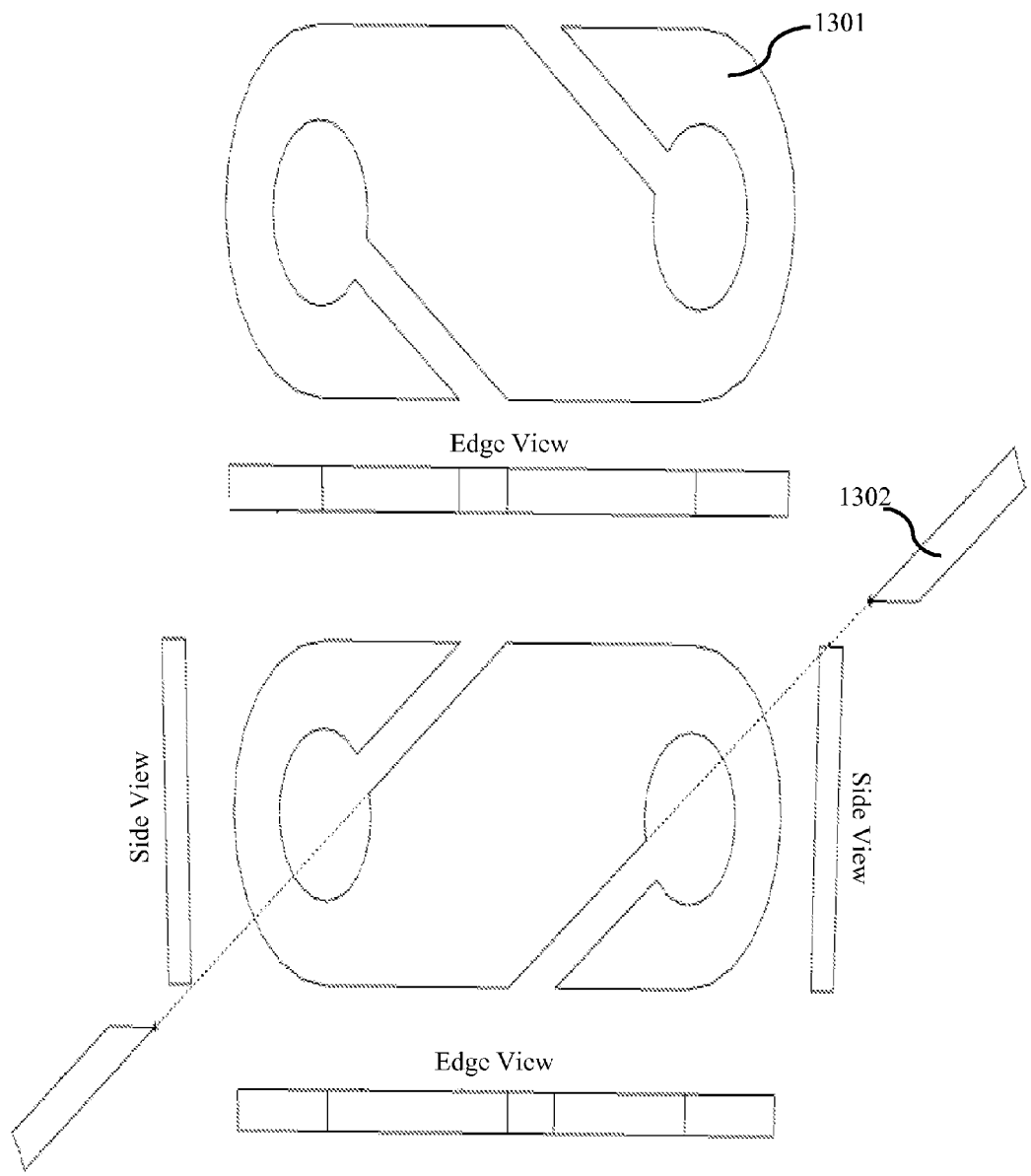
FIG. 13 illustrates an enlarged top view, a side view and an exploded assembly view of a plurality of links which are configured to conduct electricity in the HHO generating system, according to an embodiment herein.
Figure 14:
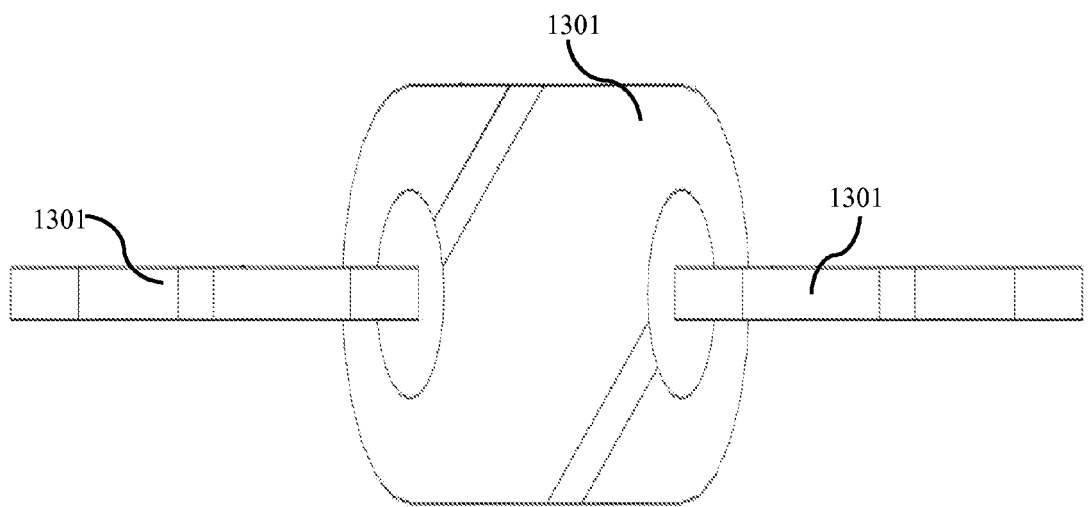
FIG. 14 illustrates a top assembly view of the pluralities of links in a HHO generating system, according to an embodiment herein.

FIG. 13 illustrates an exploded view of a plurality of links which are configured to conduct electricity and FIG. 14 illustrates a schematic diagram showing a connection pattern between the pluralities of links, according to an embodiment of the herein. In case of the air-borne automobiles, the wire/cable made of nano-carbon tubes/ribbons and/or Graphene wrapped around the conductive diamond links 1301 are spread like a web or net on the entire outer cover of the automobile. A plurality of shim-plugs 1302 is adopted in order to support and provide a level surface to the outer cover of the automobile. The conductive web prevents lightning from damaging the air-borne automobile and allows the lightning to travel around the outside composite skin surface. The lighting is used as source of power supply in the HHO generating system.

Figure 15:
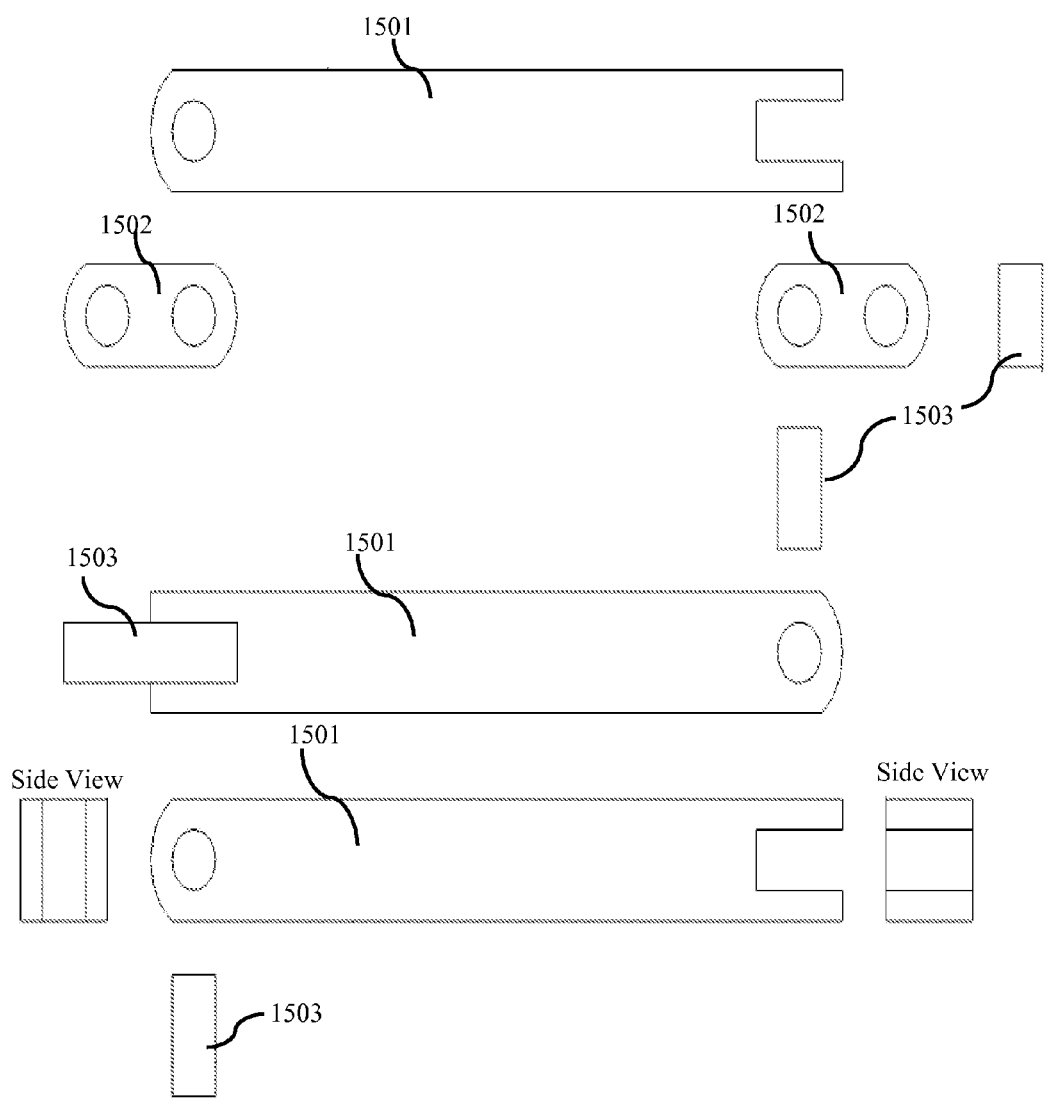
FIG. 15 illustrates an exploded assembly view of a plurality of straight links and the connecting parts in a HHO generating system, according to an embodiment herein.
Figure 16:
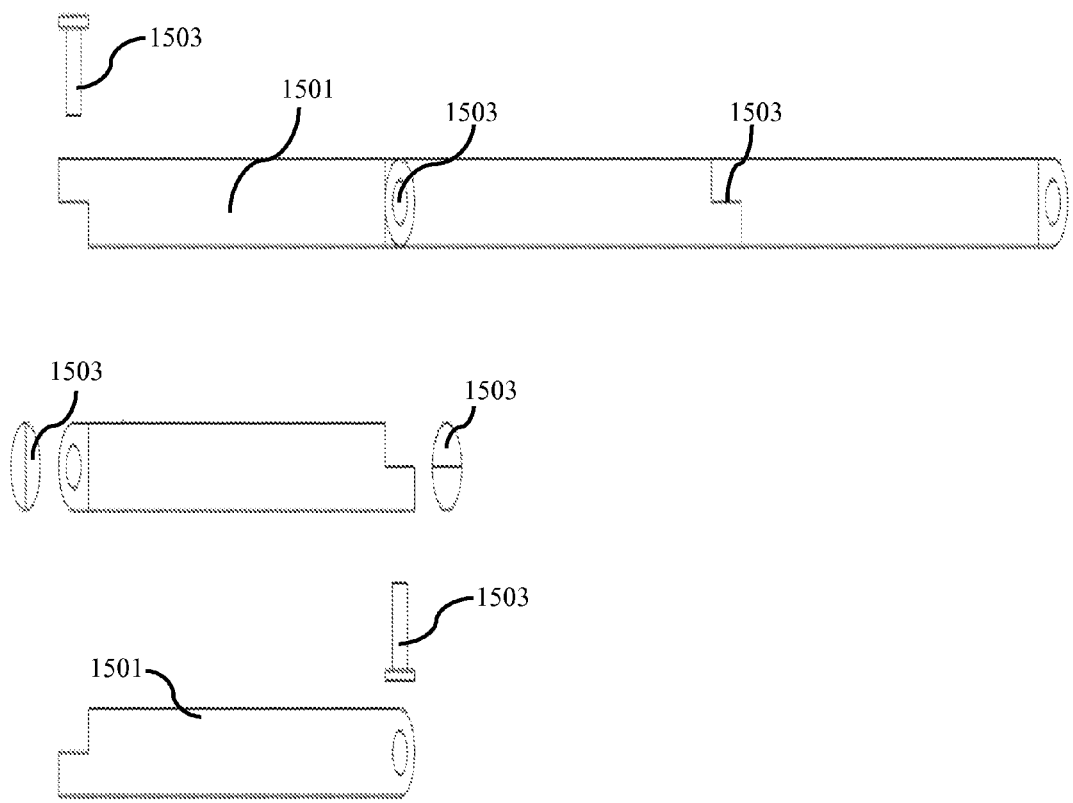
FIG. 16 illustrates a side view of an assembly of straight links in a HHO generating system, according to an embodiment herein.

FIG. 15 illustrates an exploded assembly view of a plurality of straight links and FIG. 16 illustrates a schematic diagram showing a connection pattern between the pluralities of straight links, according to an embodiment of the herein. The wire/cable is further configured to extend from the earth surface to a space station in a neutral orbit in the outer space. The straight links comprises of a plurality of short links 1502 and a plurality of long links 1501. The straight links 1501 are connected to each other through a dowel pin 1503. Using synthetic diamond links 1501 with graphite wrap enables the wire/cable to extend from the earth surface to space station in neutral orbit in outer space.

After assembling the frames and disks into a container, the frames and the disks are submerged into liquid Nitrogen/carbon and 2 Amps of electricity is applied to the 6 hours to the conductive frames/wires/disks or plates. As the electrolysis process tends to degrade/pit all metals & graphite types, so that the coating of the surface helps to slow that process.

According to an embodiment herein, the HHO generating system is alternatively used to generate methanol gas ($CH_3OH$) along with the HHO gas. The methanol is generated with hydrogen by adopting a catalytic process directly from carbon monoxide, and carbon dioxide, To generate methanol gas, an algae is added to the reaction tank with water-electrolyte solution. The solution is preserved for a particular time period, preferably 10 days so as to increase $P_H$ of the solution to at least 10, in-order to make the solution more acidic and decomposed. The decomposed algae are pumped into a machine/system that uses cavitations technology. The machine comprises a catalytic motor that heats the algae to break the algae further apart. The decomposed algae is then pump into the HHO generator, which is operated to produce methane, oxygen and hydrogen.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for generating oxygen and hydrogen using electrolysis, the system comprising:
   a container;
   a plurality of non conductive rings;
   an electrolyte solution, and wherein the electrolyte solution is pure water added with bio-solids; and
   a plurality of disks, and wherein the plurality of disks comprises a plurality of positive electrode disks, a plurality of negative electrode disks and a plurality of neutral disks, and wherein the plurality of disks are arranged in a preset sequence such that a sequence starts and ends with a positive electrode disk or a negative electrode disk, and wherein the plurality of disks are made up of metals or non metals;
   a positive electrode frame;
   a negative electrode frame;
   a plurality of non conductive plastic frames, and wherein the frames were arranged around the peripheral edges of the plurality of disks.

2. The system according to claim 1, wherein a metal is selected from a group consisting of a copper-nickel alloy, 316 L stainless steel, 347 L stainless steel, and Mixed Metal Oxide (MMO) coated metal disks, and wherein the metal is a copper-nickel alloy and wherein the copper-nickel alloy disks comprises copper and nickel mixed in a ratio of 70:30 by weight.

3. The system according to claim 1, wherein a non-metal is selected from a group consisting of a fine grain graphite, graphene, carbon nano tubes or nano-carbonribbon, MMO coated metal, Synthetic Blue diamond doped with boron, Synthetic polycrystalline diamond (PCD), and polycrystalline chemical vapor deposition (CVD) diamond.

4. The system according to claim 1, wherein the plurality of non conductive plastic frames is High-density Polyethylene (HDPE) frames and the plurality of non conductive rings is HDPE rings.

5. The system according to claim 1, wherein the plurality of disks comprises a plurality disks with holes, a plurality of disks with long slits and a plurality of dome shaped disks, and wherein the and wherein the plurality of disks with holes are used as positive electrode disks and wherein the plurality of disks with long slits are used as negative electrode disk, and wherein the plurality of dome shaped disks are used as positive or negative or neutral disks, and wherein the plurality of dome shaped disks are arranged in a concave shape and in a convex shape.

6. The system according to claim 1, wherein the preset sequence is selected from a first sequence or a second sequence or a third sequence and wherein the first sequence is represented by [+NNNN−NNNN+NNNN−NNNN+], and wherein the second sequence is represented [−NNNN+NNNN−], and wherein the third sequence is represented {[−DvDx DvDx+DvDx DvDx−] or [+DvDx DvDx−DvDx DvDx+] or [+NNNN]} and wherein + represents positive electrode disk, − represents negative electrode disk, N represents neutral disk, Dv represents concave dome shaped disk and Dx represents convex dome shaped disk.

7. The system according to claim 1, wherein the positive electrode frame is provided with a plurality of recesses to hold and support the plurality of positive electrode disks.

8. The system according to claim 1, wherein the negative electrode frame is provided with a plurality of recesses to hold and support the plurality of negative electrode disks.

9. The system according to claim 1, wherein the plurality of non conductive plastic frame is provided with a plurality of recesses to hold and support the plurality of neutral disks or a plurality of dome shaped disks.

10. The system according to claim 1, wherein the positive electrode frame and the negative electrode frame are covered with HDPE coating except on the recess areas that are configured to support and hold the positive electrode disks and the negative electrode disks.

11. The system according to claim 1, wherein the positive electrode disks and the negative electrode disks are provided with a plurality of hook like structures for fastening the positive electrode disks and the negative electrode disks respectively with the recesses in the positive electrode frame and the negative electrode frame.

12. The system according to claim 1, wherein the plurality of disks are supported in the container in such a manner that the plurality of disks is separated from one another by a preset distance, wherein the preset distance is within a range of $1/32$ of an inch-$1/4$ of an inch.

13. The system according to claim 12, wherein the preset distance is within a range of $1/16$ of an inch.

14. The system according to claim 1, wherein the container is a HDPE container.

15. The system according to claim 1, wherein the plurality of positive electrode disks is designed to generate oxygen bubbles, when electricity is passed through the plurality of positive electrode disks.

16. The system according to claim 1, wherein the plurality of negative electrode disks is designed to generate hydrogen bubbles, when electricity is passed through the plurality of negative electrode disks.

17. The system according to claim 1, further comprises a battery power supply and wherein the battery power supply is connected to the positive electrode frame and the negative electrode frame to pass current to the positive electrode disks and the negative electrode disks.

18. The system according to claim 1, wherein the container is filled with bio-solids to generate methane, hydrogen and oxygen.

19. The system according to claim 1, wherein the bio-solids is selected from a group consisting of a final stage effluent of sewage treatment plant sludge, and wherein final stage effluent of sewage treatment plant sludge comprises small particles of bacteria, algae and cow dung, and wherein the bacteria belongs to algae family.

20. The system according to claim 1 further comprises:
a plurality of extension tubes attached to the container;
a plurality of one way valves fixed to the plurality of extension tubes;
a top end cover;
a flame arrestor; and
a plurality of hoses attached to the plurality of extension tubes.

21. The system according to claim 1, wherein the system is configured to be provided in infection waste incinerator in hospitals, and in fuel cells for cars, planes, boats, and rocket systems.

22. The system according to claim 1, further comprises a barrier system for conducting electric charges, and wherein the barrier system comprises a barrier disk placed between the positive electrode disk and the negative electrode disk.

23. The system according to claim 1, wherein the positive electrode frame is provided with a first hole for receiving a nut to hold an electric wire from a positive electrode terminal of the battery power supply.

24. The system according to claim 1, wherein the negative electrode frame is provided with a second hole for receiving a nut to hold an electric wire from a negative electrode terminal of the battery power supply.

25. The system according to claim 1, wherein the container is filled with water added with Potassium Hydroxide and synthetic blue diamond material and wherein Potassium hydroxide is added to the water in the container by adding caustic Potash KOH flakes at a rate of $1/4$ of a cup per gallon of water.

26. The system according to claim 1, wherein the plurality of disks are coated with a corrosion prevention material, and wherein the corrosion prevention materials are coated in two layers, and wherein the plurality of disks are coated with a first layer of sea-salt material and a second layer of graphites or carbon nano tubes.

\* \* \* \* \*